(12) United States Patent
Cho

(10) Patent No.: US 10,838,039 B2
(45) Date of Patent: Nov. 17, 2020

(54) RADAR HAVING STRUCTURE ABLE TO SUPPRESS LOW-FREQUENCY NOISE

(71) Applicant: MANDO CORPORATION, Pyeongtaek-si (KR)

(72) Inventor: Hyeon Dong Cho, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 219 days.

(21) Appl. No.: 15/891,097

(22) Filed: Feb. 7, 2018

(65) Prior Publication Data

US 2018/0224525 A1 Aug. 9, 2018

(30) Foreign Application Priority Data

Feb. 8, 2017 (KR) .................. 10-2017-0017521

(51) Int. Cl.
| | |
|---|---|
| *G01S 7/292* | (2006.01) |
| *G01S 13/931* | (2020.01) |
| *G01S 7/03* | (2006.01) |
| *H01Q 9/04* | (2006.01) |
| *H01P 1/203* | (2006.01) |
| *H01Q 21/00* | (2006.01) |
| *H01Q 1/32* | (2006.01) |
| *H01Q 21/06* | (2006.01) |

(52) U.S. Cl.
CPC .............. *G01S 7/292* (2013.01); *G01S 7/03* (2013.01); *G01S 13/931* (2013.01); *H01P 1/2039* (2013.01); *H01Q 9/0407* (2013.01); *H01Q 21/0075* (2013.01); *G01S 2013/93271* (2020.01); *G01S 2013/93272* (2020.01); *H01Q 1/3233* (2013.01); *H01Q 21/065* (2013.01)

(58) Field of Classification Search
CPC .......... G01S 7/292; G01S 7/03; G01S 13/931; G01S 2013/9375; G01S 2013/9378; G01S 7/411; H01Q 21/0075; H01Q 9/0407; H01Q 21/065; H01Q 1/3233; H01P 1/2039
USPC ........................................................ 342/159
See application file for complete search history.

(56) References Cited

U.S. PATENT DOCUMENTS

| | | | | |
|---|---|---|---|---|
| 3,987,451 | A * | 10/1976 | Peterson ................. | H01Q 1/18 343/765 |
| 6,753,726 | B1 * | 6/2004 | Drost ..................... | H01L 23/48 257/E23.01 |
| 2003/0184381 | A1 * | 10/2003 | Wyman .................... | H03F 3/45 330/277 |
| 2007/0058748 | A1 * | 3/2007 | Kim ........................ | H04B 1/52 375/295 |

(Continued)

*Primary Examiner* — Frank J McGue
(74) *Attorney, Agent, or Firm* — Morgan, Lewis & Bockius LLP

(57) ABSTRACT

A vehicle radar. In the vehicle radar, a high-pass filter is disposed on a signal line connecting a transmitting chip and a receiving chip, the signal line allowing a local oscillation signal to be transferred therethrough. The high-pass filter prevents noise from being introduced through the signal line, along which the local oscillation signal is transferred. This prevents the accuracy of detection from being lowered by low-frequency noise generated from the interior of the vehicle radar. The high-pass filter connected to the signal line is embodied as a variety of configurations, thereby providing a structure able to effectively suppress low-frequency noise while maintaining the existing structure of the vehicle radar.

15 Claims, 8 Drawing Sheets

(56) References Cited

U.S. PATENT DOCUMENTS

| | | | | |
|---|---|---|---|---|
| 2007/0241962 A1* | 10/2007 | Shinoda | ............... | G01S 7/032 |
| | | | | 342/361 |
| 2010/0194627 A1* | 8/2010 | Negoro | ............... | G01S 13/325 |
| | | | | 342/179 |
| 2011/0193657 A1* | 8/2011 | Gautier | ............... | H01P 1/2088 |
| | | | | 333/204 |
| 2011/0316651 A1* | 12/2011 | Jung | ............... | H01P 1/2039 |
| | | | | 333/204 |
| 2012/0235857 A1* | 9/2012 | Kim | ............... | G01S 13/345 |
| | | | | 342/134 |
| 2016/0180897 A1* | 6/2016 | Shen | ............... | G11C 7/106 |
| | | | | 365/189.17 |

\* cited by examiner

RADAR HAVING STRUCTURE ABLE TO SUPPRESS LOW-FREQUENCY NOISE

CROSS REFERENCE TO RELATED APPLICATION

This application claims priority from Korean Patent Application No. 10-2017-0017521, filed on Feb. 8, 2017, which is hereby incorporated by reference for all purposes as if fully set forth herein.

BACKGROUND

Field

The present disclosure relates to a vehicle radar, and more particularly, to a vehicle radar having a structure able to suppress low-frequency noise.

Description of Related Art

A vehicle radar is a device disposed in the front portion or the rear portion of a vehicle to detect a target by transmitting and receiving radio waves using a high-frequency (or radio-frequency) signal.

A vehicle can detect an obstacle located adjacently thereto or another vehicle traveling adjacently thereto using a vehicle radar. In particular, vehicle radars are mainly used in driver support systems, such as autonomous driving systems, to acquire information regarding adjacent obstacles or vehicles.

Since vehicle radars detect a target using high-frequency signals, the accuracy of detection of vehicle radars may be influenced by low-frequency noise generated during radio transmission and/or reception of vehicle radars.

For example, when low-frequency noise is detected, a vehicle radar may recognize the low-frequency noise as a target (e.g. a ghost target) even in the case that no target is present, which is problematic.

Thus, the vehicle radar removes low-frequency noise from a signal received from an external source to detect a target using the signal from which the noise is removed.

However, low-frequency noise may be generated from the interior of the vehicle radar. In this case, the vehicle radar may not be able to discriminate whether the noise is received from an external source or whether the noise is generated from the interior thereof, which is problematic.

Accordingly, a solution for suppressing low-frequency noise generated from the interior of vehicle radars and improving the accuracy of target detection is required.

BRIEF SUMMARY

Various aspects of the present disclosure provide a vehicle radar able to suppress low-frequency noise and improve the accuracy of target detection.

Also provided is a vehicle radar able to suppress low-frequency noise generated in a line, along which a signal is transmitted and received, in the interior of the vehicle radar.

Also provided is a vehicle radar having a structure allowing a configuration able to suppress low-frequency noise to be easily disposed.

In an aspect of the present disclosure, provided is a radar including: a transmitting chip connected to a transmitting antenna to transmit a signal outwardly via the transmitting antenna; a plurality of receiving chips connected to a receiving antenna to receive a signal from an external source; a plurality of signal lines connecting the transmitting chip to the plurality of receiving chips, respectively, to transfer a signal from the transmitting chip to the plurality of receiving chips, the signal causing frequencies of the plurality of receiving chips to be synchronized with a frequency used in the transmitting chip; and high-pass filters connected to the plurality of signal lines, respectively, to filter a low-frequency component from the signal transferred along the plurality of signal lines.

Each of the high-pass filters may include one or more first stubs connected to a corresponding signal line of the plurality of signal lines in an intersecting direction and a second stub connected between the one or more first stubs and a ground layer located below the one or more first stubs.

Each of the high-pass filters may further include a dielectric disposed between the one or more first stubs and the ground layer, the second stub being disposed in a via provided in the dielectric.

The plurality of signal lines may be disposed in a single direction. The one or more first stubs connected to the corresponding signal line of the plurality of signal lines may be disposed on a single side of the plurality of signal lines.

The one or more first stubs connected to a signal line of the plurality of signal lines may be disposed on one side of the plurality of signal lines. The one or more first stubs connected to another signal line of the plurality of signal lines may be disposed on the other side of the plurality of signal lines.

At least one first stub of the one or more first stubs connected to the plurality of signal lines may have a bend comprised of a portion disposed perpendicularly to the plurality of signal lines and a portion disposed in parallel to the plurality of signal lines.

In another aspect of the present disclosure, provided is a radar including: a transmitting chip connected to a transmitting antenna to transmit a signal outwardly via the transmitting antenna; a receiving chip connected to a receiving antenna to receive a signal from an external source; a signal line connecting the transmitting chip and the receiving chip to transfer a signal from the transmitting chip to the receiving chip, the signal causing a frequency of the receiving chip to be synchronized with a frequency used in the transmitting chip; and a high-pass filter connected to the signal line to filter a low-frequency component transferred along the signal line.

According to embodiments, it is possible to prevent a signal, transferred from the transmitting chip to the receiving chip, from including low-frequency noise, by disposing the high-pass filter on the signal line, along which a signal for frequency synchronization is transmitted from the transmitting chip to the receiving chip, in the interior of the vehicle radar.

According to embodiments, it is possible to suppress low-frequency noise in a signal transmitted from the transmitting chip to the receiving chip, thereby preventing the accuracy of target detection from being degraded by low-frequency noise generated from the interior of the vehicle radar.

According to embodiments, it is possible to easily embody high-pass filter for suppressing noise depending on the structure of the vehicle radar, since the high-pass filter disposed on the signal line connecting the transmitting chip and the receiving chip can have a variety of structures.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
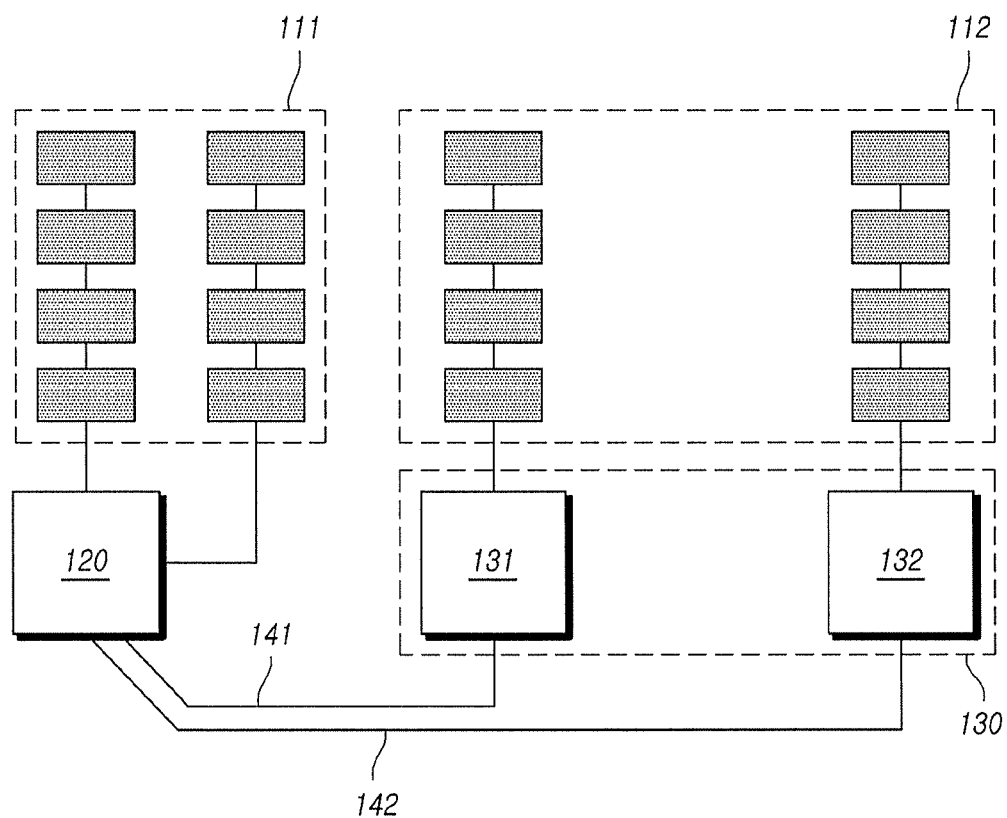
FIG. 1 illustrates an exemplary structure of a vehicle radar according to embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from another element. The substance, sequence, order, or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 illustrates an exemplary structure of a vehicle radar 100 according to embodiments.

Referring to FIG. 1, the vehicle radar 100 according to embodiments includes a transmitting chip 120, a transmitting antenna 111 connected to the transmitting chip 120, receiving chips 130, a receiving antenna 112 connected to the receiving chips 130, and signal lines 141 and 142 connecting the transmitting chip 120 and the receiving chips 130.

The transmitting chip 120 outputs a signal that the vehicle radar 100 transmits outwardly. The transmitting chip 120 outwardly transmits a high-frequency (or radio-frequency) signal, in the foist of waves, via the transmitting antenna 111.

The receiving chips 130 may be one or more receiving chips 130, depending on the vehicle radar 100. The receiving chips 130 are configured to receive signals from external sources via the receiving antenna 112 and detect targets using received signals.

The transmitting chip 120 and the receiving chips 130 may be connected via the signal lines 141 and 142, along which a signal is transferred from the transmitting chip 120 to the receiving chips 130.

For example, the transmitting chip 120 may transfer a frequency synchronization signal, causing frequencies of the receiving chips 130 to be synchronized with a frequency used in the transmitting chip 120, to the receiving chips 130 via the signal lines 141 and 142.

In this case, a local oscillator of the transmitting chip 120 generates a local oscillation signal for frequency synchronization of the receiving chips 130, and the local oscillation signal is transferred to the receiving chips 130 via the signal lines 141 and 142.

The receiving chips 130 may convert the frequencies thereof using the local oscillation signal received from the transmitting chip 120 to be synchronized with the frequency used in the transmitting chip 120.

Such frequency conversion in the receiving chips 130 may be performed using a mixer included in each of the receiving chips 130.

Figure 2:
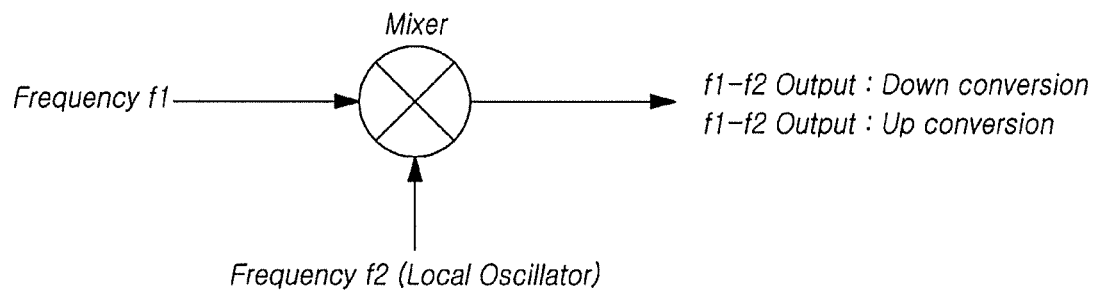
FIG. 2 illustrates an exemplary mixer included in each of the receiving chips of the vehicle radar according to embodiments.

FIG. 2 illustrates an exemplary mixer included in each of the receiving chips 130 of the vehicle radar 100 according to embodiments.

Referring to FIG. 2, the mixer included in each of the receiving chips 130 may convert the frequency of each of the receiving chips 130 using a frequency f1, in addition to a frequency f2 received from the local oscillator of the transmitting chip 120.

For example, the mixer may down-convert the frequency of each of the receiving chips 130 by outputting a value obtained by subtracting the frequency f2, received from the local oscillator of the transmitting chip 120, from the frequency f1.

Alternatively, the mixer may up-convert the frequency of each of the receiving chips 130 by outputting a value obtained by adding the frequency f2, received from the local oscillator of the transmitting chip 120, to the frequency f1.

Thus, the transmitting chip 120 may transmit the local oscillation signal, generated by the local oscillator, to the receiving chips 130, via the signal lines 141 and 142, while the receiving chips 130 may synchronize the frequencies thereof with the frequency of the transmitting chip 120 by up-converting or down-converting the frequency using the mixer.

Here, low-frequency noise may be transferred to the receiving chips 130 via the signal lines 141 and 142, along which the local oscillation signal is transferred from the transmitting chip 120 to the receiving chips 130.

When the low-frequency noise is received, the receiving chips 130 cannot determine whether the low-frequency noise is a signal received via the receiving antenna 112 or a signal output from the transmitting chip 120. It is thereby difficult to suppress low-frequency noise in a signal received for the detection of a target.

The vehicle radar 100 according to embodiments is provided with a configuration able to suppress low-frequency noise, disposed on the signal lines 141 and 142, along which a local oscillation signal is transferred from the transmitting chip 120 to the receiving chips 130. It is thereby possible to remove low-frequency noise in the interior of the vehicle radar 100 while improving the accuracy of target detection of the vehicle radar 100.

Figure 3:
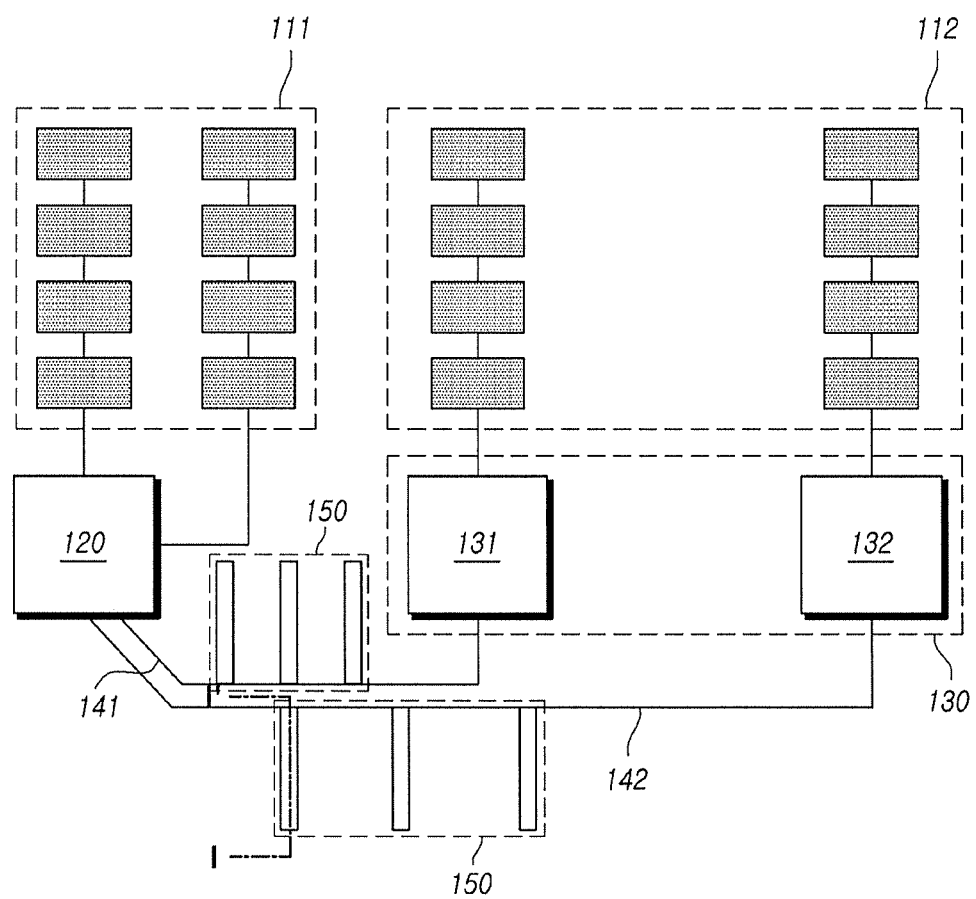
FIG. 3 illustrates an exemplary structure including high-pass filters disposed on signal lines connecting a transmitting chip and receiving chips in the vehicle radar according to embodiments.

FIG. 3 illustrates an exemplary structure including high-pass filters 150 disposed on signal lines 141 and 142 connecting a transmitting chip 120 and receiving chips 130 in the vehicle radar 100 according to embodiments.

Referring to FIG. 3, the vehicle radar 100 according to embodiments includes the transmitting chip 120, a transmitting antenna 111 connected to the transmitting chip 120, the receiving chips 130, and a receiving antenna 112 connected to the receiving chips 130.

The signal lines 141 and 142 for transferring a local oscillation signal, output by the transmitting chip 120, to the receiving chips 130 are disposed between the transmitting chip 120 and the receiving chips 130.

The signal lines 141 and 142 connect between the transmitting chip 120 and the receiving chips 130. The signal lines 141 and 142 may be provided in a number equal to the number of the receiving chips 130 to connect between the transmitting chip 120 and the receiving chips 130.

High-pass filters 150 are disposed on the signal lines 141 and 142. The high-pass filters 150 are connected to the signal lines 141 and 142, respectively, to remove low-frequency noise in the signal lines 141 and 142.

The high-pass filters 150 are connected to the signal lines 141 and 142 connecting the transmitting chip 120 and the receiving chips 130, respectively. The high-pass filters 150 may be disposed in the shape of one or more stubs.

For example, the high-pass filter 150 having the shape of a stub may be disposed on one side of the signal line 141 connecting the transmitting chip 120 and the receiving chip 131.

In addition, the high-pass filter 150 having the shape of a stub may be disposed on the other side of the signal line 142 connecting the transmitting chip 120 and the receiving chip 132.

The high-pass filters 150 may be disposed in the shape of one or more stubs. The shape, width, size, and number of the stubs of the high-pass filters 150 may be variously embodied depending on the structure of the vehicle radar 100 and the level of low-frequency noise generated in the signal lines 141 and 142.

The high-pass filters 150 may be connected between the signal lines 141 and 142, connecting the transmitting chip 120 and the receiving chips 130, and a ground layer to suppress low-frequency noise that would otherwise be introduced to the signal lines 141 and 142.

Accordingly, the high-pass filters 150 connected to the signal lines 141 and 142 can prevent low-frequency noise from being transferred to the receiving chips 130, so that performance degradation within the vehicle radar 100 due to low-frequency noise can be prevented.

Figure 4:
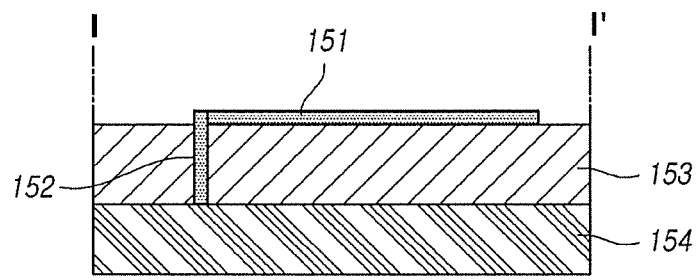
FIG. 4 illustrates a cross-section of a portion of the vehicle radar illustrated in FIG. 3, taken along I-I' line.

FIG. 4 illustrates a cross-section of a portion of the vehicle radar 100 illustrated in FIG. 3, taken along I-I' line.

Referring to FIG. 4, the high-pass filter 154, connected to a corresponding signal line of the signal lines 141 and 142 connecting the transmitting chip 120 and the receiving chip 130, may include a first stub 151 connected to the signal line 141 or 142 and disposed coplanarly with the signal line 141 or 142 and a second stub 152 connected to the first stub 151 and connected to the ground layer 154 located below the first stub 151.

A dielectric 153 may be disposed between the first stub 151 and the ground layer 154, and the second stub 152 may be disposed in a via formed in the dielectric 153.

Specifically, the first stub 151 is disposed coplanarly with the signal line 141 or 142, while the second stub 152 is disposed in the via of the dielectric 153 located below the first stub 151 to connect the first stub 152 and the ground layer 154 located below the dielectric 153.

Accordingly, a structure enabling low-frequency noise generated in the signal lines 141 and 142 to be filtered by the first stub 151 and the second stub 152 connected to the ground layer 154 is provided.

Consequently, within the vehicle radar 100, the high-pass filters 154 connected to the signal lines 141 and 142, along which local oscillation signals are transmitted from the transmitting chip 120 to the receiving chip 130, can prevent low-frequency noise from being transferred to the receiving chips 130 through the signal lines 141 and 142.

It is thereby possible to prevent low-frequency noise from being introduced into the receiving chips 130 through the signal lines 141 and 142, along which local oscillation signals are transmitted, thereby preventing the accuracy of target detection from being degraded by low-frequency noise generated from the interior of the vehicle radar 100 and improve the performance of the vehicle radar 100.

The high-pass filters 154 connected to the signal lines 141 and 142 connecting the transmitting chip 120 and the receiving chips 130 may be variously disposed depending on the number or the arrangement structure of the signal lines 141 and 142 connecting the transmitting chip 120 and the receiving chips 130.

Figure 5:
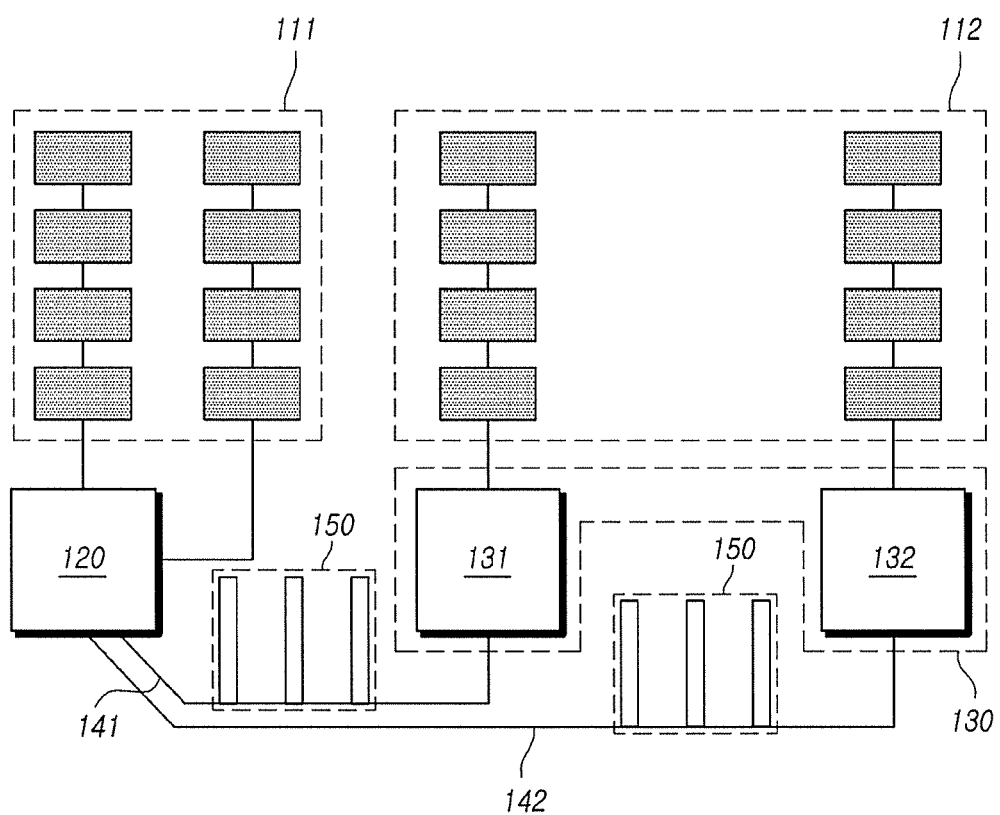
FIGS. 5 and 6 illustrate other exemplary structures including high-pass filters connected to signal lines connecting a transmitting chip and receiving chips in the vehicle radar according to embodiments.

FIG. 5 illustrates another exemplary structure including high-pass filters 150 connected to signal lines 141 and 142 connecting a transmitting chip 120 and receiving chips 130 in the vehicle radar 100 according to embodiments.

Referring to FIG. 5, the vehicle radar 100 according to embodiments includes the transmitting chip 120, a transmitting antenna 111, the receiving chips 130, a receiving antenna 112, the signal lines 141 and 142, along which local oscillation signals are transmitted, and the high-pass filters 150 connected to the signal lines 141 and 142.

In a case in which two receiving chips 130 are disposed in the vehicle radar 100, two signal lines 141 and 142 may be disposed to connect the transmitting chip 120 and the receiving chips 130, respectively.

In addition, the high-pass filters 150 connected to the signal lines 141 and 142 may be disposed on the same side with respect to the signal lines 141 and 142.

Specifically, the high-pass filter 150 connected to the signal line 141, by which the transmitting chip 120 and the receiving chip 131 are connected, and the high-pass filter 150 connected to the signal line 142, by which the transmitting chip 120 and the receiving chip 132 are connected, may be disposed on the same side of the signal lines 141 and 142.

Consequently, the high-pass filters 150 can be easily disposed to suppress low-frequency noise in the signal lines 141 and 142 connecting the transmitting chip 120 and the receiving chips 130 of the vehicle radar 100 while maintaining the existing structure of the vehicle radar 100.

In addition, when the high-pass filters 150 connected to the signal lines 141 and 142 are provided as two or more high-pass filters 150, the high-pass filters 150 may be disposed at the same distance.

Alternatively, when two or more high-pass filters 150 are connected to the signal lines 141 and 142, the high-pass filters 150 may be disposed at different distances. The distances between the high-pass filters 150 may be determined to increase or decrease in the direction of the receiving chips 130.

In addition, the shape, width, size, and number of the high-pass filters 150 connected to the signal lines 141 and 142 may be variously embodied. The shape of the high-pass filters 150 may be variously embodied depending on the arrangement structure of the transmitting chip 120 and the receiving chips 130 in the vehicle radar 100.

Figure 6:
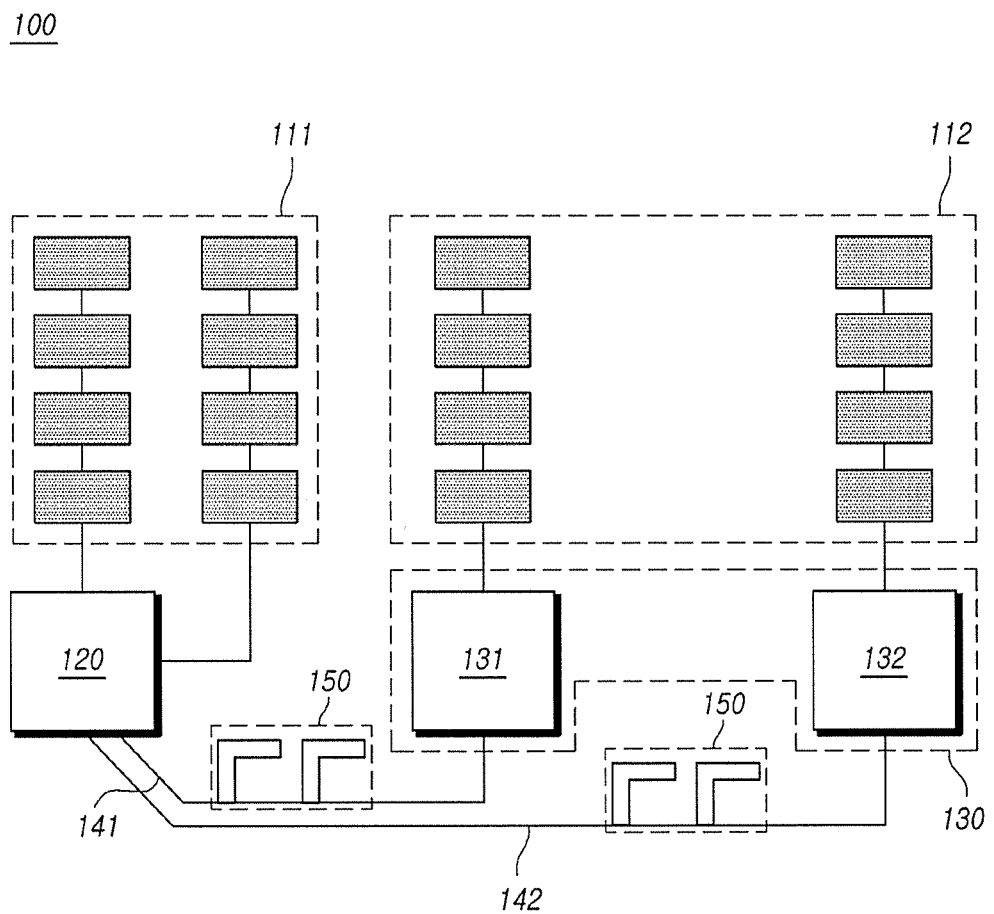

FIG. 6 illustrates a further exemplary structure including high-pass filters 150 connected to signal lines 141 and 142 connecting a transmitting chip 120 and receiving chips 130 in the vehicle radar 100 according to embodiments.

Referring to FIG. 6, the high-pass filters 150 may be connected to the signal lines 141 and 142, along which local oscillation signals are transmitted from the transmitting chip 120 to the receiving chips 130, in the vehicle radar 100 according to embodiments.

Each of the high-pass filters 150 may include a first stub 151 connected to the signal line 141 or 142 and disposed coplanarly with the signal line 141 or 142 and a second stub 152 connected between the first stub 151 and the ground layer 154 located below the first stub 151.

The first stub 151 of the high-pass filter 150 may be provided as one or more first stubs 151. The first stub 151 may be shaped such that at least a portion thereof is bent.

For example, the first stub 151 of the high-pass filter 150 may include a bend. Specifically, the first stub 151 may be comprised of a portion perpendicularly connected to the signal line 141 or 142 and a portion disposed in parallel to the signal line 141 or 142. In another example, the first stub 151 of the high-pass filter 150 may include a plurality of bend.

Figure 7:
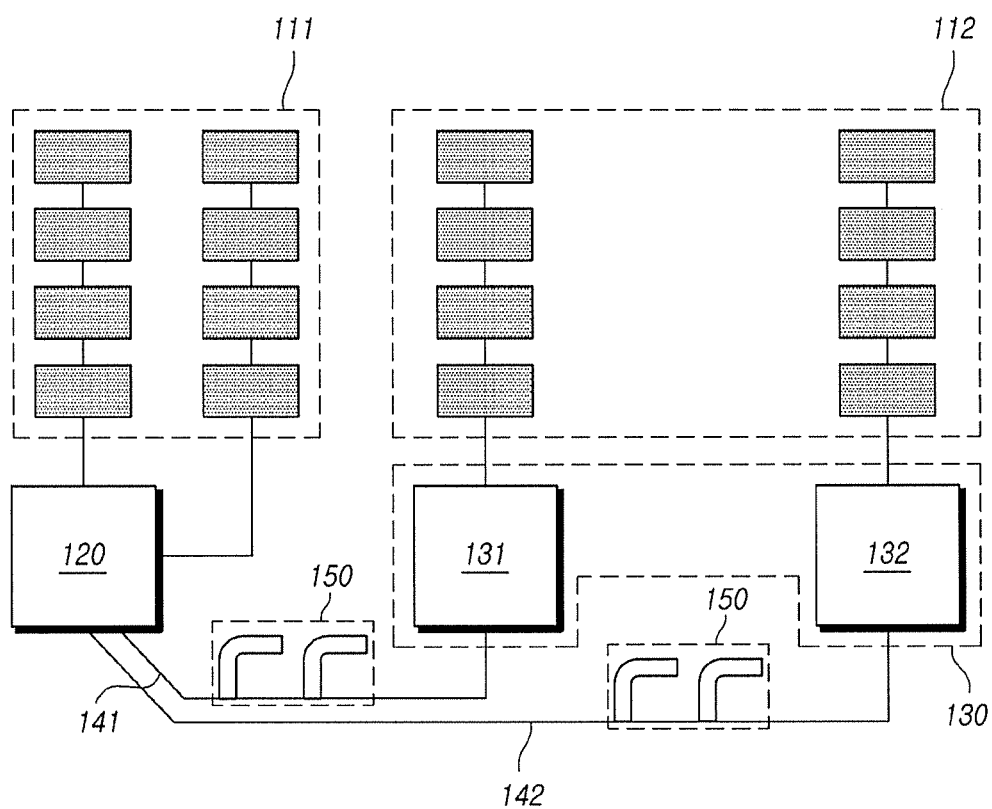
FIG. 7 illustrates another exemplary structure of the first stub according to embodiments.

FIG. 7 illustrates another exemplary structure of the first stub according to embodiments.

In another example, a first stub 151 of each of high-pass filters 150 may have a bend. Referring to FIG. 7, the bend of the first stub 151 may have a predetermined curvature, unlike the high-pass filters 150 illustrated in FIG. 6.

The first stub 151 may include a perpendicularly-angled bend, as illustrated in FIG. 6, or a curved bend, as illustrated in FIG. 7.

Since the first stubs 151, disposed coplanarly with the signal lines 141 and 142 to suppress low-frequency noise of the signal lines 141 and 142, have a bent shape (i.e. a shape including a bend), a structure able to suppress low-frequency noise of the signal lines 141 and 142 while minimizing spaces in which the first stubs 151 are disposed can be provided.

In addition, referring to FIGS. 6 and 7, the high-pass filters 150 connected to the two signal lines 141 and 142, respectively, are illustrated as being disposed on the same side of the signal lines 141 and 142. It should be understood, however, that the high-pass filters 150 connected to the signal lines 141 and 142, respectively, may be disposed on different sides of the signal lines 141 and 142.

As described above, in the vehicle radar 100 according to embodiments, the high-pass filters 150 are connected to the signal lines 141 and 142, along which local oscillation signals are transmitted from the transmitting chip 120 to the receiving chips 130, such that the first stubs 151, disposed coplanarly with the signal lines 141 and 142, of the high-pass filters 150 may be embodied in a variety of sizes, numbers, and shapes.

Figure 8:
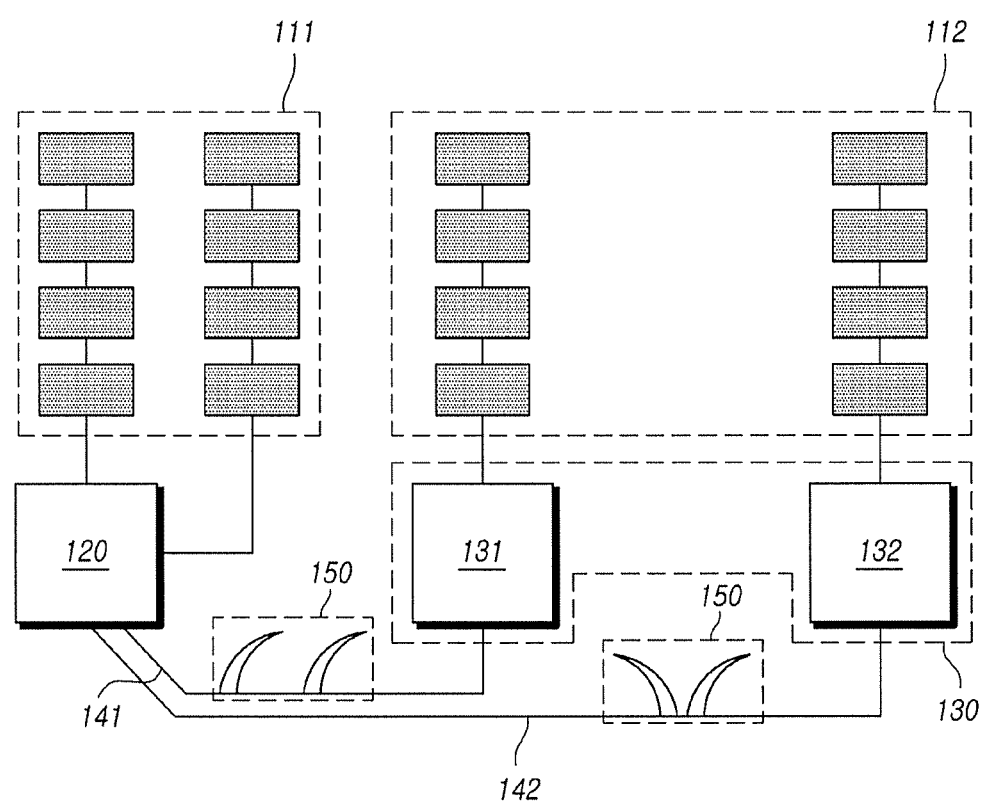
FIG. 8 illustrates an exemplary structure according to embodiments, in which the width of first stubs decreases in the direction of second stubs.

FIG. 8 illustrates an exemplary structure according to embodiments, in which the width of first stubs decreases in the direction of second stubs.

Referring to FIG. 8, in high-pass filters 150, first stubs 151, disposed coplanarly with signal lines 141 and 142, may be embodied in a variety of widths and directions.

In an example, in each of the high-pass filters 150, the first stub 151 may be configured such that the width of a portion thereof connected to the signal line 141 or 142 may differ from the width of a portion thereof connected to a second stub 152.

In another example, the first stub 151 may be configured such that the width thereof decreases in the direction from the signal line 141 or 142 to the second stub 152.

Referring to FIG. 8, each of the first stubs 151 is illustrated as including a bend. However, even in the case in which the first stub 151 does not have a bend, as illustrated in FIG. 5, the first stub 151 may be configured such that the width thereof changes, as illustrated in FIG. 8.

As illustrated in FIG. 8, the first stubs 151 may be disposed in the same shapes or in symmetric shapes.

Consequently, a structure connecting the high-pass filters 150 to the signal lines 141 and 142, along which local oscillation signals are transmitted, can be easily embodied in the interior of the vehicle radar 100. It is also possible to suppress low-frequency noise generated in the signal lines 141 and 142, thereby improving the accuracy of target detection of the vehicle radar 100.

According to embodiments, it is possible to prevent low-frequency noise from being transferred to the receiving chips 130 through the signal lines 141 and 142, by disposing the high-pass filters 150 on the signal lines 141 and 142, along which local oscillation signals are transmitted from the transmitting chip 120 to the receiving chips 130 in the interior of the vehicle radar 100.

It is therefore possible to prevent the accuracy of target detection of the receiving chips 130 from being lowered by low-frequency noise generated from the interior of the vehicle radar 100.

In addition, since the high-pass filters 150 connected to the signal lines 141 and 142 can be variously embodied, depending on the arrangement structures of the transmitting chip 120, the receiving chips 130, and the signal lines 141 and 142, a structure able to effectively suppress low-frequency noise generated from the interior of the vehicle radar 100 while maintaining the existing structure of the vehicle radar 100 can be provided.

The foregoing descriptions and the accompanying drawings have been presented in order to explain the certain principles of the present disclosure. A person skilled in the art to which the present disclosure relates could make many modifications and variations by combining, dividing, substituting for, or changing the elements without departing from the principle of the present disclosure. The foregoing embodiments disclosed herein shall be interpreted as illustrative, while not being limitative of the principle and scope of the present disclosure. It should be understood that the scope of the present disclosure shall be defined by the appended Claims and all of their equivalents fall within the scope of the present disclosure.

What is claimed is:

1. A radar comprising:
   a transmitting chip connected to a transmitting antenna to transmit a signal outwardly via the transmitting antenna;
   a plurality of receiving chips connected to a receiving antenna to receive a signal from an external source;
   a plurality of signal lines connecting the transmitting chip to the plurality of receiving chips, respectively, to transfer a synchronization signal generated by the transmitting chip to the plurality of receiving chips, the synchronization signal causing frequencies of the plurality of receiving chips to be synchronized with a frequency used in the transmitting chip; and high-pass filters connected to the plurality of signal lines, respectively, to filter a low-frequency component from the synchronization signal transferred along the plurality of signal lines.

2. The radar according to claim 1, wherein each of the high-pass filters comprises one or more first stubs connected to a corresponding signal line of the plurality of signal lines in an intersecting direction and a second stub directly connecting an end of a corresponding one of the one or more first stubs to a ground layer located below the one or more first stubs.

3. The radar according to claim 2, wherein each of the high-pass filters further comprises a dielectric disposed between the one or more first stubs and the ground layer, the second stub being disposed in a via provided in the dielectric.

4. The radar according to claim 2, wherein the plurality of signal lines are disposed in a single direction, and the one or more first stubs connected to the corresponding signal line of the plurality of signal lines are disposed on a single side of the plurality of signal lines.

5. The radar according to claim 2, wherein the plurality of signal lines are disposed in a single direction, the one or more first stubs connected to a signal line of the plurality of signal lines are disposed on one side of the plurality of signal lines, and the one or more first stubs connected to another signal line of the plurality of signal lines are disposed on the other side of the plurality of signal lines.

6. The radar according to claim 2, wherein at least one first stub of the one or more first stubs connected to the corresponding signal line of the plurality of signal lines comprises a bend.

7. The radar according to claim 6, wherein the at least one first stub comprises a plurality of bends.

8. The radar according to claim 2, wherein two or more first stubs of the one or more first stubs are disposed at a same distance.

9. The radar according to claim 2, wherein each of the one or more first stubs is configured such that a width of a portion thereof connected to the corresponding signal line differs from a width of a portion thereof connected to the second stub.

10. The radar according to claim 2, wherein each of the one or more first stubs is configured such that a width thereof decreases in a direction from the corresponding signal line to the second stub.

11. A radar comprising:
a transmitting chip connected to a transmitting antenna to transmit a signal outwardly via the transmitting antenna;
a receiving chip connected to a receiving antenna to receive a signal from an external source;
a signal line connecting the transmitting chip and the receiving chip to transfer a synchronization signal generated by the transmitting chip to the receiving chip, the synchronization signal causing a frequency of the receiving chip to be synchronized with a frequency used in the transmitting chip; and
a high-pass filter connected to the signal line to filter a low-frequency component transferred along the signal line.

12. The radar according to claim 11, wherein the high-pass filter comprises a first stub connected to the signal line and disposed in a direction intersecting the signal line and a second stub directly connecting an end of the first stub to a ground layer located below the first stub.

13. The radar according to claim 12, wherein the high-pass filter further comprises a dielectric disposed between the first stub and the ground layer, the second stub being disposed in a via provided in the dielectric to connect the first stub and the ground layer.

14. The radar according to claim 12, wherein the high-pass filter comprises a plurality of first stubs, each connected to one of a plurality of signal lines, and the at least one of the plurality of first stubs connected to the corresponding signal line of the plurality of signal lines comprises a bend.

15. The radar according to claim 12, wherein the high-pass filter comprises a plurality of first stubs each connected to one of a plurality of signal lines and each of the plurality of first stubs is configured such that a width of a portion thereof connected to the corresponding signal line differs from a width of a portion thereof connected to the second stub.

* * * * *